Jan. 12, 1932.  C. W. SINCLAIR  1,840,824
VEHICLE WHEEL
Filed Jan. 6, 1930  2 Sheets-Sheet 2
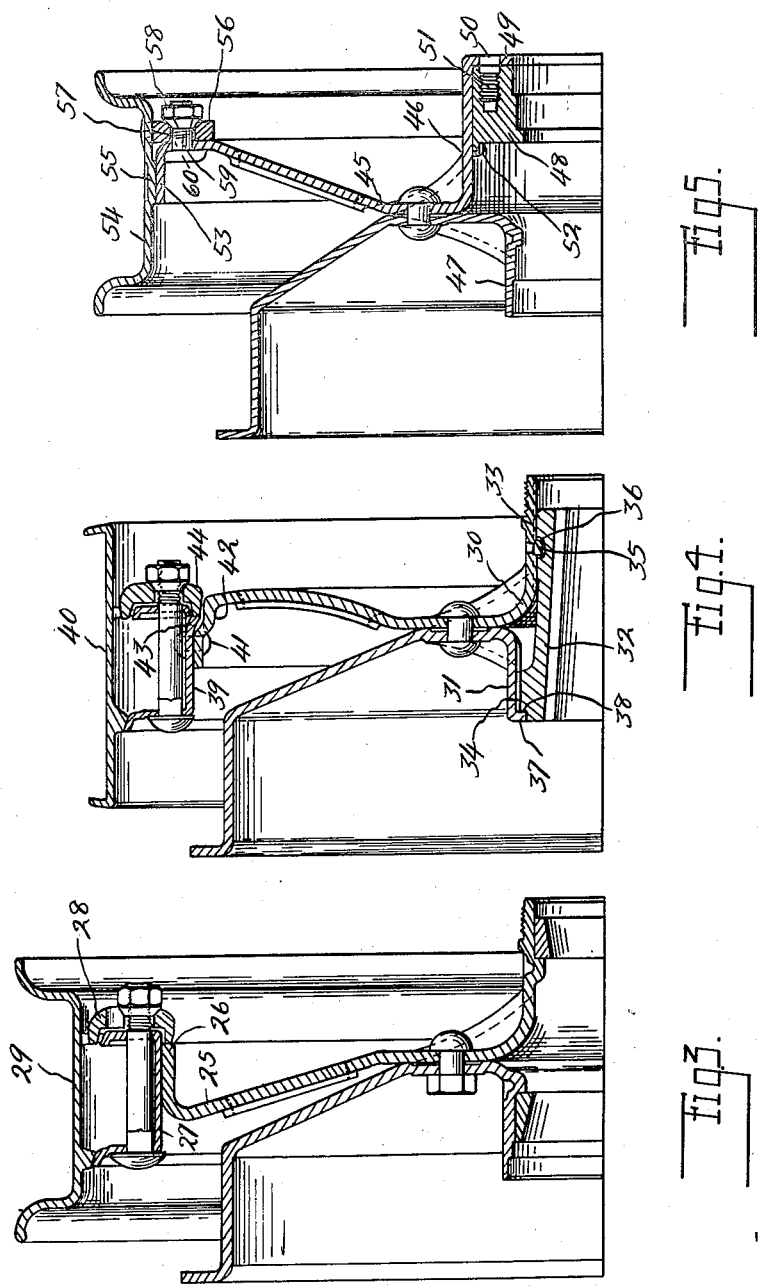
INVENTOR
Charles W. Sinclair
BY
ATTORNEYS Patented Jan. 12, 1932

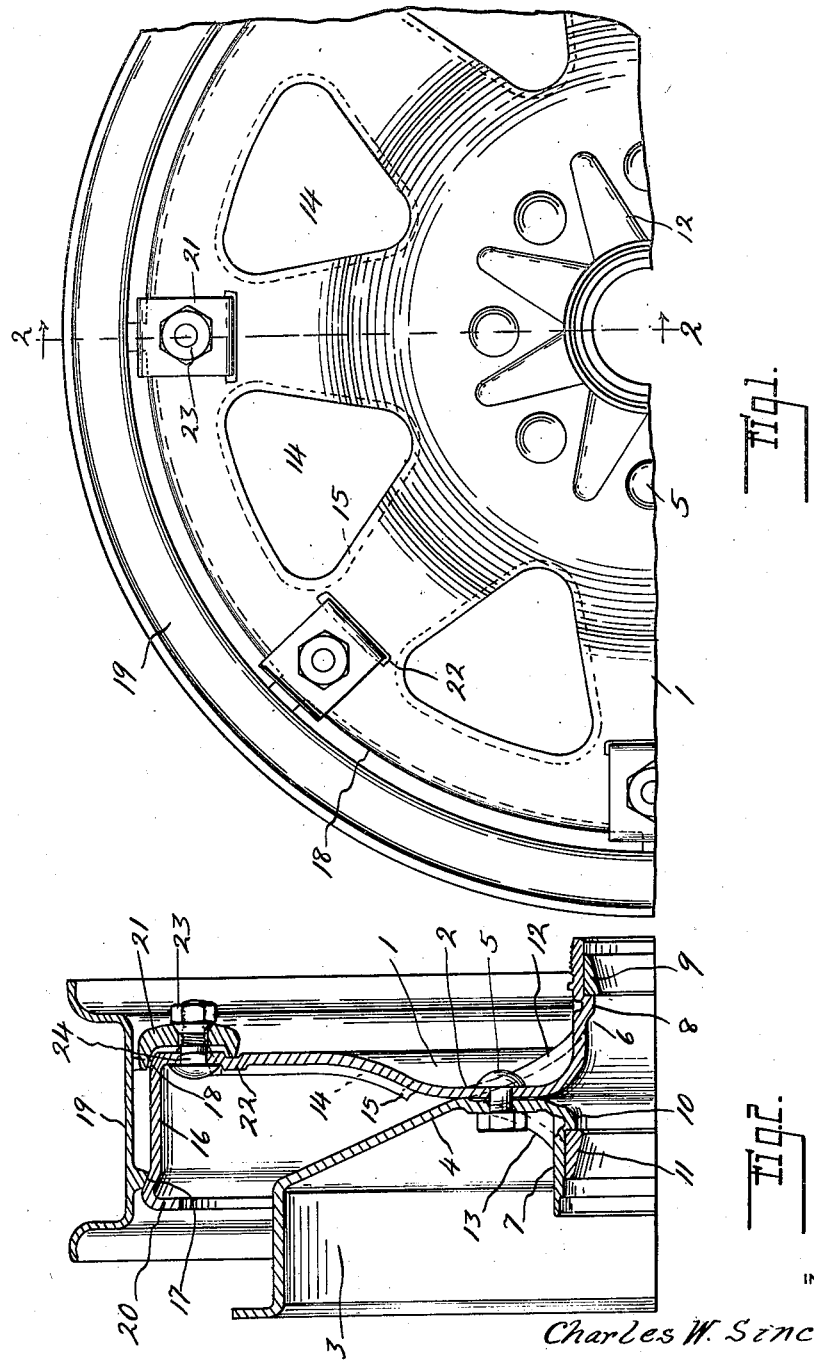

1,840,824

UNITED STATES PATENT OFFICE

CHARLES W. SINCLAIR, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed January 6, 1930. Serial No. 418,895.

The invention relates to vehicle wheels and more particularly to metal wheels for motor vehicles. Some of the objects of the invention are to so construct the wheel that it may be manufactured at relatively low cost; to so construct the wheel that the number of parts forming the body and hub may be reduced; and to so construct the wheel that the brake drum and wheel body form the hub of the wheel. Other objects of the invention reside in the novel features of construction and combinations and arrangements of parts as more fully hereinafter set forth.

In the drawings:—

Figure 1 is a front elevation of a vehicle wheel embodying my invention;

Figure 2 is a cross section on the line 2—2 of Figure 1;

Figures 3, 4 and 5 are views similar to Figure 2, showing modifications.

As shown in Figures 1 and 2, 1 is a sheet steel disk having the radially extending portion 2. 3 is a sheet steel member in the form of a brake drum in the rear of the disk and having the inner part of its radially extending web 4 in contact with the rear face of the inner part of the radially extending portion 2 and secured thereto by suitable means such as the annular series of axially extending rivets 5. The wheel disk has the integral central forwardly extending annular portion 6, while the brake drum has the integral central rearwardly extending annular portion 7, both of which portions cooperate to form the hub of the wheel and to receive the bearing or supporting member. The annular portion 6 is formed with the series of inward depressions 8 providing shoulders or abutments for the outer race 9 of an anti-friction bearing, this race being pressed into the annular portion 6 for permanent engagement therewith. The annular portion 7 has the series of inward depressions 10 providing shoulders or abutments for the outer race 11 of an anti-friction bearing, which is also pressed into the annular portion 7 for permanent engagement therewith.

For reinforcing the disk and the brake drum adjacent to their hub forming portions, I have provided the pressed radially extending ribs 12 and 13 respectively extending between the radially extending portions and the annular portions of the disk and brake drum and located between the rivets 5.

The disk 1 is preferably provided with the annular series of openings 14 and has at the edges of these openings the rearwardly turned flanges 15 which serve to reinforce the disk. The disk also has at its outer edge the transverse rearwardly extending flange 16 providing the tapered seats 17 and 18 for engagement with the tire carrying rim 19. This flange preferably terminates in the inwardly extending radial portion 20 which serves to reinforce the flange and hold the same circular. For serving to locate the clamps 21 used in securing the rim upon the disk, the latter is formed with the rearwardly extending depressions 22 radially inward from the transverse flange 16 and serving as recessed fulcrum portions for the inner flanged ends of the clamps. These clamps are adapted to be secured in place by means of the nuts 23 threaded upon the bolts 24, which latter are secured in place by means of the nuts 23 threaded upon the bolts 24, which latter are secured to and extend forwardly from the disk.

The modification shown in Figure 3 has the same general arrangement of parts with the exception that the outer edge of the disk 25 is formed with the transverse forwardly extending flange 26 which is encircled by and has permanently secured thereto the felly 27. The forward edge of the flange 26 is adapted to engage the clamps 28 used in securing the tire carrying rim 29 upon the felly.

The modification shown in Figure 4 is a rear wheel instead of a front wheel and the central annular portions 30 and 31 of the disk and brake drum are slightly changed to accommodate the single or solid bearing or supporting sleeve member 32 which is adapted to be keyed upon a drive shaft. In detail, the annular portions 30 and 31 are non-rotatably secured upon the bearing member 32 as by being splined thereto through the series of grooves 33 and 34 extending longitudinally of the inner faces of these annular portions and cooperating keys upon the bearing member and preferably integral therewith engaging these grooves. The annular portions are held from longitudinal disengagement from the bearing member by means of the series of inward depressions 35 upon the annular portion 30 intermediate the grooves 33 engaging the annular groove 36 of the bearing member and the inwardly extending annular flange 37 upon the annular portion 31 and at the rear end thereof abutting the annular shoulder 38 formed at the rear end of the bearing member.

The disk of this modification has secured thereto the felly 39 which is adapted to seat the demountable tire carrying rim 40. The disk has, as shown, the rearwardly extending transverse flange 40 upon which is mounted the felly 39. Suitable means such as the rivets 41 secure the felly to the flange. The flange has the peripherally spaced series of inwardly depressed portions 42 into which extend the tongues 43 pressed inwardly from the base of the felly. These tongues are adapted to form the abutments for the inner flanges of the clamps 44 used in detachably securing the rim to the felly.

In the modification of Figure 5, a rear wheel is shown having the sheet steel disk 45 which forms the wheel body and is provided with the integral central forwardly extending annular portion 46. The sheet steel member 47, which is a brake drum, is in the rear of the disk 45 and has its web rigidly secured to this disk radially outwardly beyond the annular portion 46. This brake drum has the integral central rearwardly extending annular portion 47 which is of smaller diameter than the annular portion 46. The annular portion 47 is formed in much the same manner as the annular portion 7 of Figures 1 and 2 to receive the outer race of an anti-friction bearing member. 48 is an outer bearing member or spacer having its inner face formed to receive the outer race of an anti-friction bearing member. The front end of the annular portion 46 has the radially inwardly extending annular flange 49 for abutting the front end of the member 48, this flange being provided with the annular series of apertures 50 which register with tapped recesses 51 formed in the member 48 and extending parallel to its axis. Suitable means for securing the wheel to the axle are adapted to extend through these apertures and engage these recesses.

The member 48 is preferably inserted into place prior to securing the brake drum to the disk and for holding this member in place and against the flange 49 suitable means, such as the brazing material 52, is used.

The disk 45 has at its outer edge the rearwardly extending annular flange 53 upon which may be seated the tire carrying rim 54. This tire carrying rim has the series of depressions 55 formed in its base for engaging the flange 53. 56 are lugs suitably secured to the base of the rim 54 as by being riveted thereto. These lugs extend radially inward and are formed with the transverse openings 47 having flared outer ends for receiving the tapering portions of the clamping nuts 58 which are threaded upon the bolts 59 extending through the openings 57 and the portion of the disk near its outer flange. These bolts are formed with the heads 60 at the rear of the disk which are permanently secured to this disk.

From the above description it will be seen that I have constructed a metal wheel having but few parts and so arranged that they form the wheel body and the wheel hub. More specifically, the brake drum and disk form a wheel unit, including the wheel body and hub.

What I claim as my invention is:

1. In a vehicle wheel, the combination of a disk forming the body of the wheel and a member secured to the disk, the disk and member having integral centrally located annular portions forming the hub of the wheel with the annular portion of the disk of greater diameter than that of the member secured to the disk, and a bearing member within the annular portion of the disk for receiving an anti-friction bearing.

2. In a vehicle wheel, the combination of a disk forming the body of the wheel and having a peripheral annular flange for receiving a rim member and a central forwardly extending annular portion terminating in an inwardly extending flange, a member secured to said disk and having a central annular portion of less diameter than the first mentioned annular portion, and a spacer secured within the first mentioned annular portion and against the inwardly extending flange.

3. In a vehicle wheel, the combination of a disk forming the body of the wheel and a member, said disk and member having radially extending portions fixedly secured to each other and also having integral centrally located and oppositely directed annular portions extending from said radially extending portions and forming the hub of the wheel with one annular portion of greater diameter than the other and having an inwardly extending flange at its outer end, and a bearing member permanently secured within the annular portion of greater diameter and at the inner side of said flange.

In testimony whereof I affix my signature.

CHARLES W. SINCLAIR.